US011248697B2

United States Patent
Loeffelmann et al.

(10) Patent No.: US 11,248,697 B2
(45) Date of Patent: Feb. 15, 2022

(54) PLANETARY GEAR TRAIN

(71) Applicant: Schaeffler Technologies AG & Co. KG, Herzogenaurach (DE)

(72) Inventors: Jochen Loeffelmann, Eggolsheim (DE); Gerhard Nagengast, Heroldsbach (DE); Peter Welker, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 81 days.

(21) Appl. No.: 16/636,566

(22) PCT Filed: Jul. 24, 2018

(86) PCT No.: PCT/DE2018/100662
§ 371 (c)(1),
(2) Date: Feb. 4, 2020

(87) PCT Pub. No.: WO2019/024959
PCT Pub. Date: Feb. 7, 2019

(65) Prior Publication Data
US 2021/0156467 A1 May 27, 2021

(30) Foreign Application Priority Data
Aug. 4, 2017 (DE) .......................... 102017117692.6

(51) Int. Cl.
*F16H 57/08* (2006.01)
*F16H 57/04* (2010.01)

(52) U.S. Cl.
CPC ....... *F16H 57/082* (2013.01); *F16H 57/0479* (2013.01)

(58) Field of Classification Search
None
See application file for complete search history.

(56) References Cited

U.S. PATENT DOCUMENTS

| 7,695,399 | B2 | 4/2010 | Sowul et al. | |
| 8,500,591 | B2* | 8/2013 | Turner | B60K 17/046 |
| | | | | 475/159 |
| 8,905,894 | B2 | 12/2014 | Koyama et al. | |
| 9,803,742 | B1* | 10/2017 | Raju | F16H 57/0486 |

FOREIGN PATENT DOCUMENTS

| DE | 2855545 | 4/1980 |
| DE | 10236753 | 2/2004 |
| DE | 102006001286 | 7/2006 |
| DE | 102007017138 | 10/2008 |
| DE | 102010047139 | 4/2012 |
| DE | 112010004918 | 11/2012 |
| DE | 102011088643 | 6/2013 |
| EP | 0274874 | 12/1987 |
| WO | 2014135161 | 9/2014 |

* cited by examiner

*Primary Examiner* — Colby M Hansen
(74) *Attorney, Agent, or Firm* — Volpe Koenig

(57) ABSTRACT

A planetary gear train which includes a planet carrier having at least one radial wall with pin bores formed therein, planetary gear pins that are seated in said pin bores on at least one end, planetary gears that are arranged on the planetary gear pins, and a ring gear that is attached to the radial wall and dimensioned such as to rise radially above an inner enveloping circle of the pin bores. The radial wall carrying an annular collar and the ring gear is axially secured to the annular collar.

19 Claims, 3 Drawing Sheets

PLANETARY GEAR TRAIN

CROSS-REFERENCE TO RELATED APPLICATIONS

This application is a 371 National Phase of PCT/DE2018/100662, filed Jul. 24, 2018, which claims the benefit of German Patent Application No. 10 2017 117 692.6, filed Aug. 4, 2017, both of which are incorporated by reference herein as if fully set forth.

TECHNICAL FIELD

The disclosure relates to a planetary gear train having a planet carrier, planetary gear pins which are seated at least at one end in pin bores which are formed in a radial wall of the planet carrier, and planetary gears which are arranged on the planetary gear pins.

BACKGROUND

From DE 11 2010 004 918 T5 there is known a planetary gear train of the above-mentioned type. The planetary gear pins are seated with a tight fit in pin bores which are formed in the radial wall of the planet carrier. An annular disk is attached to the radial wall. This annular disk covers the end faces of the planetary gear pins and prevents the planetary gear pins from falling out of the pin bores.

From DE 10 2006 001 286 A1 there is known a planet carrier arrangement which comprises a plurality of planetary gears which are rotatably mounted on planetary gear pins, wherein a turned groove is formed on each pin. A locator ring is attached to the planetary gear pins so that the locator ring engages into the turned grooves in the planetary gear pins. The locator ring ensures both axial and rotational positioning of the planetary gear pins in the planet carrier housing.

SUMMARY

The object underlying the disclosure is to provide solutions which make it possible to create a planetary gear train which is distinguished by a robust construction and can be manufactured in an advantageous manner from the point of view of assembly.

The disclosure provides a planetary gear train having:
 a planet carrier which comprises at least one radial wall with pin bores formed therein,
 planetary gear pins which are seated at least at one end in the pin bores,
 planetary gears which are arranged on the planetary gear pins, and
 an annular disk which is attached to the radial wall and is so dimensioned that it stands up radially above an inner enveloping circle of the pin bores, wherein
 the radial wall carries an annular collar, and
 the annular disk is axially fixed to the radial collar.

It is thus possible in an advantageous manner to create a loss-prevention arrangement which reliably prevents the pins from falling out of the planet carrier and additionally also makes it possible to effectively prevent rotation of the planetary gear pins about their pin axes.

The annular disk is preferably so configured that it is in engagement with the respective planetary gear pin in such a manner that the planetary gear pins are secured against rotation about their planetary gear pin axes. For this purpose, the annular disk is preferably seated on an end-face portion of the respective planetary gear pin, wherein there is formed in the end-face region of the planetary gear pin adjacent to the annular disk a contact geometry which engages with the outer contour of the annular disk.

The arrangement is preferably so designed that the annular disk is in contact with the respective planetary gear pin in such a manner that the planetary gear pins are secured against falling out axially but have axial play which is sufficient, in the case of deformation, in particular also thermal expansion, of the planetary gear pins not to achieve over-determination and thus structural distortion.

The contact geometry cooperating with the annular disk preferably forms an arc segment whose radius corresponds to the outside radius of the annular disk. In this embodiment, the outer contour of the annular disk can be a circular contour. It is, however, also possible to configure the contact geometry provided by the planetary gear pins as, for example, a planar surface, in which case the outer contour of the annular disks is preferably in the form of a complementary polygonal contour. The contact geometry can be divided into a plurality of portions, wherein, however, preferably those zones of the contact geometry that come into contact with the annular disk are at a sufficient radial distance, in particular as great a radial distance as possible, from the center axis of the planetary gear pin to effectively support the planetary gear pin bi-directionally against intrinsic rotation about its center axis. The contact geometry can comprise a portion which engages axially over the annular disk, which in turn engages in a form-locking manner behind the annular disk. This makes it possible to achieve bidirectional axial securing (axial interlocking) of the planetary gear pin via this engagement.

According to a particular aspect of the present disclosure, the annular disk is preferably in such a form that the outside radius of the annular disk is smaller than or equal to the bolt circle radius of the planetary gear pin bores. Overall, the outer geometry of the annular disk is preferably so matched to the position of the planetary gear pins that, when measured from the edge of the respective planetary gear pin, at least 25% of the diameter of the planetary gear pin is covered.

The annular disk provided according to the disclosure is preferably manufactured from a high-strength and hardened spring steel material as a stamped or drawn part. The annular disk is preferably in such a form that it comprises a collar portion and is seated via the collar portion on the annular collar of the planet carrier. Retaining claws can advantageously be formed in the region of the collar portion of the annular disk, which retaining claws can each be deflected in a radial direction relative to the central axis of the annular disk.

On the annular collar of the planet carrier there is preferably formed a counter-geometry, into which the retaining claws engage in a form-locking manner. This counter-geometry formed on the annular collar of the planet carrier is preferably in such a form that it provides an annular end face on which the retaining claws are supported axially. This counter-geometry can in particular be formed as a peripheral groove, a flat groove or a turned groove. It is preferably located close to the axial end region of the annular collar facing away from the planetary gear.

It is also possible to form the annular disk in such a manner that it is seated on the annular collar of the planet carrier in a frictionally engaged manner by way of interlocking.

According to a particular aspect of the present disclosure, the planetary gear train according to the disclosure forms a differential for achieving a power split in the drive train of a motor vehicle. It can be used as an axle differential, or also as a so-called middle differential.

According to a further aspect of the present disclosure, the planetary gear train is in the form of a spur-gear differential. The planet carrier can thereby carry a toothed ring portion which functions as the driving gear of the planet carrier. The toothed ring portion can be manufactured integrally with the planet carrier. Alternatively, it is also possible to manufacture the planet carrier and the toothed ring portion as separate components and then to connect them, wherein this connection can be realized either by releasable connecting elements or also, for example, by at least local welded joints.

The annular collar formed on the planet carrier is formed on the planet carrier concentrically with the axis of rotation thereof. It can provide a seat for an inner or outer ring of a rolling bearing in its inner region or also in its outer peripheral region. The annular collar is so dimensioned that its outer peripheral surface is located within the inner enveloping circle defined by the planetary gear pin bores, or is locally slightly encompassed by that inner enveloping circle. As regards its inside diameter, the annular collar is preferably so dimensioned that a sun gear can be guided through the annular collar, which sun gear in the assembled position engages radially from the inside into the planetary gear associated therewith.

In the inner region of the annular collar of the planet carrier there is preferably formed a seat surface which functions as an axial limitation for an annular cover which, after insertion of the sun gear, is likewise inserted in, in particular pressed into, the annular collar and which axially supports the adjacent sun gear.

The planetary gear train according to the disclosure can further be in such a form that the planet carrier comprises two radial walls, each of which is provided with an annular collar on each of which an annular disk according to the disclosure is axially anchored and axially supports the planetary gear pins and prevents them from rotating about their own axes.

The concept according to the disclosure creates a securing device which is formed from a securing ring, having a hollow-cylindrical portion and a radial flange, and an annular groove in the planet carrier. Alternatively, the annular groove can be omitted and the securing ring can be axially fixed by interlocking on the hollow-cylindrical portion or a press-fit of the hollow-cylindrical portion on a collar of the planet carrier. The securing ring is preferably a structural element manufactured without cutting, for example by drawing or stamping.

In the context of the present description, the term "inner enveloping circle" is to be understood as meaning a circle which is concentric with the axis of rotation of the planet carrier and is tangent to the inner edges of the pin bores facing the axis of rotation. The annular disk described above thus protrudes, from the inside, radially beyond this enveloping circle at least in the region of the pin bores and thus penetrates the bore plane of the planetary gear pin bores. The annular disk at least partially covers the end faces of the planetary gear pins. A special geometry can be formed on those end faces which is so matched that, in conjunction with the edge contour of the annular disk, it limits or prevents intrinsic rotation of the planetary gear pins about their respective longitudinal axes.

BRIEF DESCRIPTION OF THE DRAWINGS

Further details and features of the disclosure will become apparent from the following description in conjunction with the drawing, in which.

DETAILED DESCRIPTION

Figure 1:
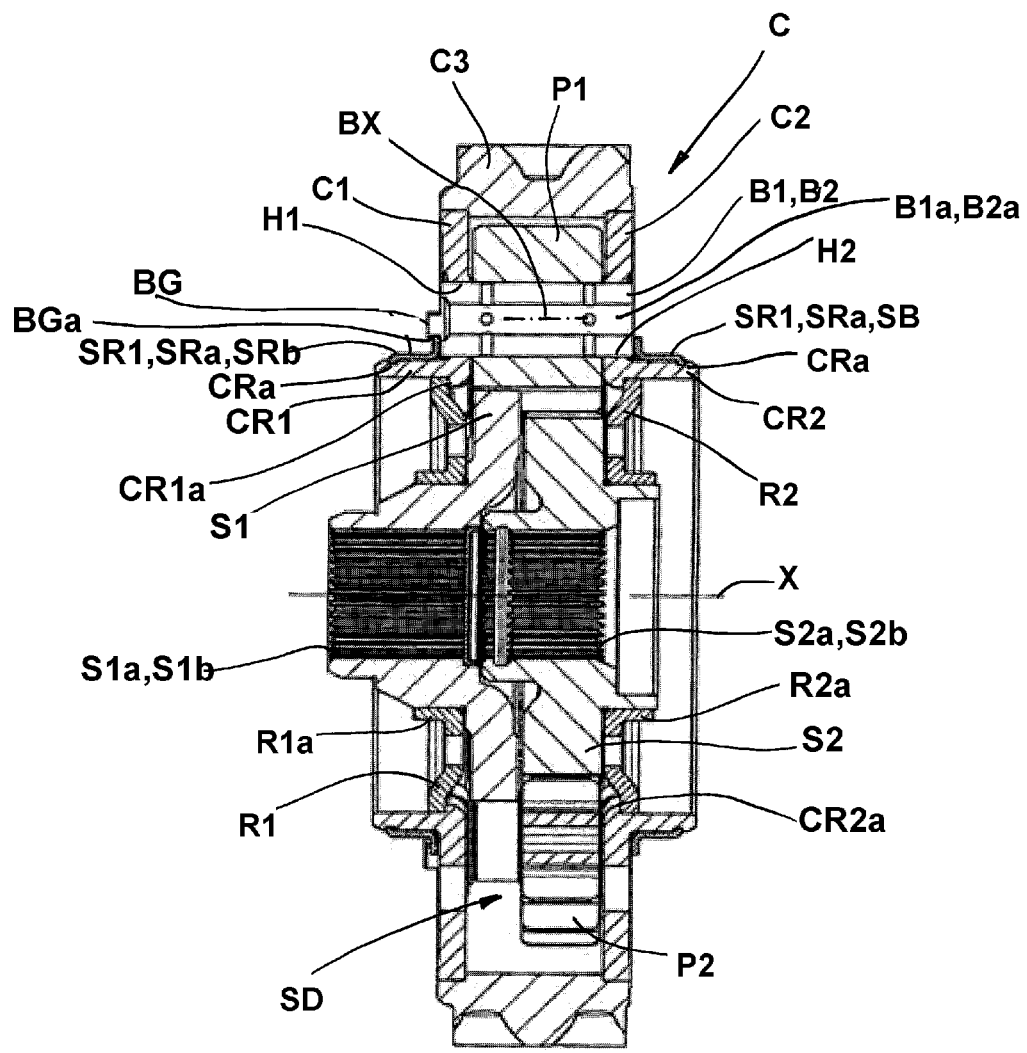
FIG. 1 is an axial sectional representation illustrating the construction of a planetary gear train according to the disclosure according to a first preferred embodiment of the disclosure having two annular disks, attached axially from the outside, for axially securing the planetary gear pins and for securing them against rotation about their respective axes.

The representation according to FIG. 1 shows a first exemplary embodiment of a planetary gear train according to the disclosure having a planet carrier C which comprises at least a first radial wall C1 and a second radial wall C2 with pin bores H1, H2 formed therein, as well as planetary gear pins B1, B2 which are seated at least at one end in the pin bores H1, H2. Planetary gears P1, P2 are arranged and rotatably mounted on the planetary gear pins B1, B2.

Attached to each of the first radial wall C1 and the second radial wall C2 is an annular disk SR1, SR2. The two annular disks SR1, SR2 are each so dimensioned that they stand up radially above an inner enveloping circle of the pin bores H1, H2 and thus penetrate the radial plane of the pins B1, B2.

Both the first radial wall C1 and the second radial wall C2 each carry an annular collar CR1, CR2. The annular disks SR1, SR2 are pushed concentrically onto the two annular collars CR1, CR2 and axially fixed on the respective annular collar CR1, CR2.

The annular disk SR1 on the left in this representation is in engagement with the respective planetary gear pin B1, B2 in such a manner that the planetary gear pins B1, B2 are secured against rotation about their planetary gear pin axes BX. The annular disks SR1, SR2 are each seated on an end-face portion of the respective planetary gear pin B1, B2 and prevent axial creeping of the pins B1, B2.

At least on one side of the planetary gear pins B1, B2 there is formed in the end-face region of the planetary gear pin B1, B2 adjacent to the annular disk SR1 a contact geometry BG in the form of a projection protruding beyond the end-face plane of the outer side of the radial wall C1, which projection engages on the outer contour of the annular disk SR1. The contact geometry BG forms an arc segment BGa whose radius corresponds to the outside radius of the annular disk SR1. The arc segment BGa is interrupted by a central oil bore, but the basic rotation-preventing action is brought about by those zones of the arc segment BGa that are situated close to the peripheral plane of the planetary gear pin B1, B2. The two annular disks SR1, SR2 are so dimensioned that the outside radius of the respective annular disk SR1, SR2 is smaller than or equal to the pitch circle radius of the planetary gear pin bores H and larger than the inner enveloping circle of the planetary gear pin bores H1, H2.

In the exemplary embodiment shown here, the two annular disks SR1, SR2 are of the same construction. In this exemplary embodiment, each annular disk SR1, SR2 is in such a form that it forms a collar portion SRa and is seated via that collar portion SRa on the annular collar CR1, CR2 of the planet carrier C.

On each annular disk SR1, SR2 there are formed retaining claws SRb in the region of the collar portion SRa. A counter-geometry is thereby formed on the respective annular collar CR1, CR2 of the planet carrier C, into which counter-geometry the retaining claws SRb engage. The counter-geometry CRa formed on the respective annular collar CR1, CR2 of the planet carrier P provides an annular end face on which the retaining claws SRb are axially supported.

The two radial walls C1, C2 carry a toothed ring C3 which, as such, functions as a driving toothed wheel for the planet carrier C and forms a rigid component thereof. The inner mechanics of the planetary gear train is in the form of a so-called spur-gear differential SD. This spur-gear differential SD comprises a first driven sun gear S1 and a second driven sun gear S2. These two sun gears S1, S2 are arranged axially immediately adjacent to one another and are coupled for rotation in opposite directions via the planetary gears P1, P2. In the preferred structural form shown here, the first driven sun gear S1 is in such a form that its root circle is larger than the tip circle of the second driven sun gear. This feature of the geometry is achieved by profile displacement, the driven sun gears S1, S2 otherwise have the same number of teeth and equal moduli.

The first planetary gears P1 engage radially from the outside into the first driven sun gear S1. With regard to their axial length, they are so dimensioned that they extend (outside the tip circle of the second driven sun gear) into the tooth plane of the second sun gear, where they engage into the second planetary gears P2, which in turn engage radially from the outside into the second driven sun gear S2.

The first and the second annular collar CR1, CR2 each form an inner peripheral wall which is delimited by a shoulder CR1a, CR2a. An annular cover R1, R2 is inserted into both structures, which annular cover is centered by the mentioned inner peripheral walls and is positioned axially by the shoulders CR1a, CR2a.

The two annular covers R1, R2 form inner collar portions R1a, R2a which as such effect radial and axial mounting of the driven sun gears S1, S2. The driven sun gears S1, S2 form inner bores S1a, S2a which are provided with an axial tooth system S1b, S2b into which end portions of wheel drive shafts, which are not shown in greater detail here, can be inserted in a rotationally fixed manner.

The planetary gear pins B1, B2 are drilled axially hollow. The bores B1a, B2a which extend in the pins B1, B2 act as lubricant channels. The annular disks SR1, SR2 are so dimensioned that they do not, or do not excessively, cover the lubricant channels. It is possible to configure the annular disks SR1, SR2 in such a manner that they provide a lubricant collecting or lubricant guiding function, by which the flow of lubricant into the inner region of the planetary gear pins B1, B2, that is to say into the inner bores B1a, B2a thereof, is assisted.

In accordance with the concept according to the disclosure, a component operating as a snap ring is fitted on both sides in order to prevent or at least limit axial creeping of the planetary gear pins B1, B2. A slight play is provided axially, in order not to distort the rings SR1, SR2. The planetary gear pins B1, B2 have a special end machining in order to ensure that the pins B1, B2 are secured against rotation. This end machining provides geometries BG which engage over the respective ring SR1, SR2. Since the pins B1, B2 are arranged on different pitch circle diameters, the end machining can be so realized, according to a particular aspect of the present disclosure, that the pin can be used for both pitch circle diameters by being correspondingly rotated through 180°. That is to say, in a first assembled position it fits bores which are situated on the smaller pitch circle, and in a position rotated through 180° it fits bores which are situated on the larger pitch circle. Alternatively, the outer contour of the snap ring can also be in such a form that it achieves different radial heights in succession. The snap ring SR1, SR2 is so designed that it snaps into a groove CRa which is preferably formed on a hub collar CR1, CR2 of the planet carrier C, and thus an additional part is not required.

In the exemplary embodiment of a planetary gear train shown in FIG. 1, the planetary gear train is an axially short spur-gear differential whose driven sun gears S1, S2 are arranged immediately adjacent to one another. The total width of the external tooth system of the first driven sun gear S1 and of the second driven sun gear S2 is less than or equal to the width of the tooth system of the toothed ring C3. At least one of the planet carrier walls C1, C2 can be integrally manufactured with the toothed ring C3. The freewheel of the first planetary gear P1 relative to the second driven sun gear S2 is brought about in that the first driven sun gear S1 is in such a form that its root circle radius is larger than the tip circle radius of the second driven sun gear S2, wherein this geometric matching is achieved by profile displacement with an otherwise equal number of teeth of the two driven sun gears S1, S2.

Figure 2:
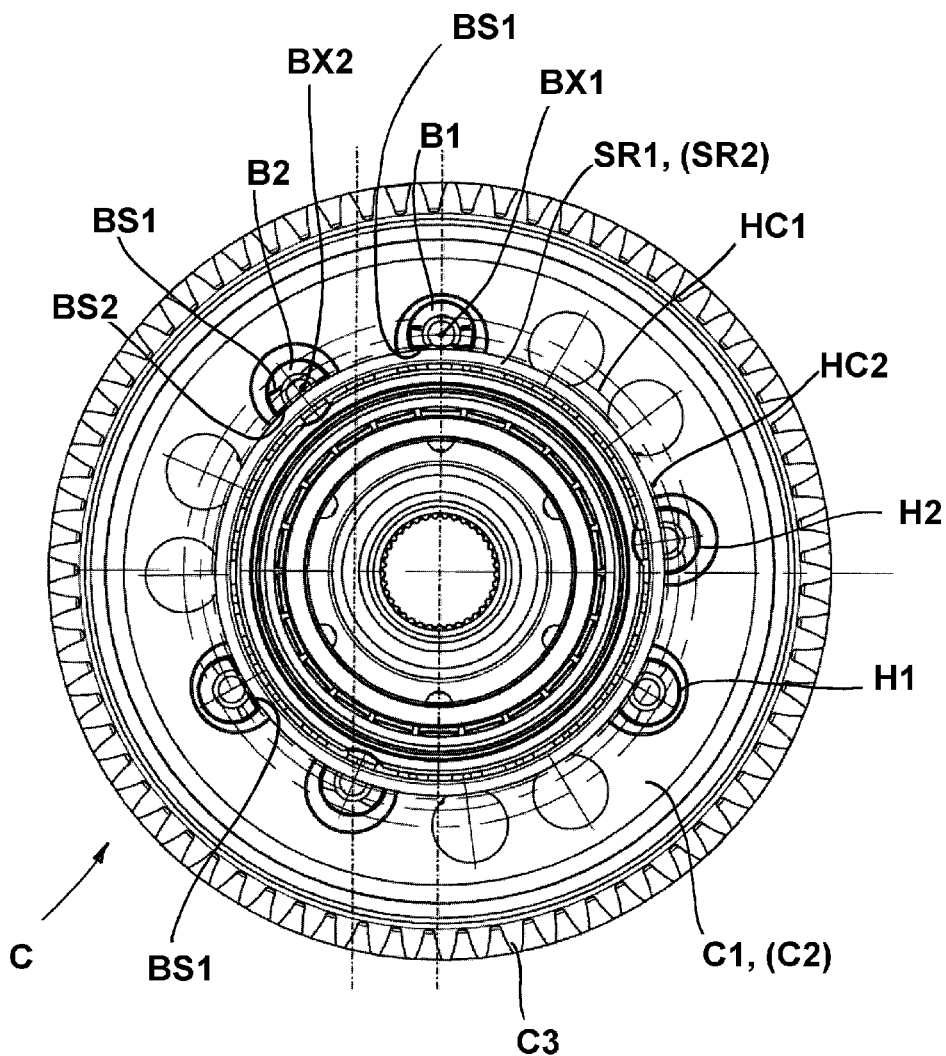
FIG. 2 is a plan view of the planetary gear train according to FIG. 1 to illustrate the outer contour of the first annular disk and of the end faces of the planetary gear pins cooperating therewith.

The representation according to FIG. 2 further illustrates the interplay of the annular disks SR1 (SR2 is concealed on the rear side) fitted according to the disclosure to the end faces of the planetary gear pins B1, B2. The planetary gear pins B1 support the first planetary gears P1. The planetary gear pins B2 support the axially shorter second planetary gears P2. The axes BX1 of the first planetary gear pins B1 lie on a first pitch circle HC1 whose diameter is larger than the diameter of the second pitch circle HC2 on which the axes BX2 of the second planetary gear pins B2 lie. The planetary gear pins B1, B2 are of identical construction. The end face that cooperates with the first annular disk SR1 is in such a form that it provides a first arc segment BS1 which, in the case of the installation of the pins B1 on the first pitch circle HC1, touches the outer contour of the first annular disk SR1. The end face additionally provides a second arc segment BS2 which, in the case of the installation of the pins B2 on the second pitch circle HC2, protrudes at the outer contour of the first annular disk SR1.

The planetary gear train according to the disclosure can be provided as a compact, prefabricated assembly group for a vehicle transmission. It then has the outward appearance of a solid spur gear with a largely concealed interior, of which there are visible only the two inner internally toothed shaft insert bores formed by the driven sun gears S1, S2 and divided in the longitudinal direction. The toothed wheel C3 forms a seat for the radial walls C1, C2 and couples those two side walls C1, C2 together in a rotationally fixed manner. The pin bores H1, H2 can already be formed in the radial walls C1, C2 before the radial walls C1, C2 are mounted on the toothed wheel C3. However, in particular in the case where the radial walls C1, C2 are connected to the toothed wheel C3 via welded joints, it is also possible to produce the pin bores H1, H2 or machine them to their final dimensions only after the radial walls C1, C2 have been connected to the toothed wheel C3. Further surfaces of the radial walls C1, C2, in particular the inner and outer peripheral surfaces of the annular collars CR1, CR2, can also be reworked by cutting after the components C1, C2, C3 have been connected together. It is also possible to configure the outer contour of the annular disks SR1, SR2 to be non-round, and optionally to secure the annular disks against rotation also in interplay with the planetary gear pins B1, B2.

Figure 3:
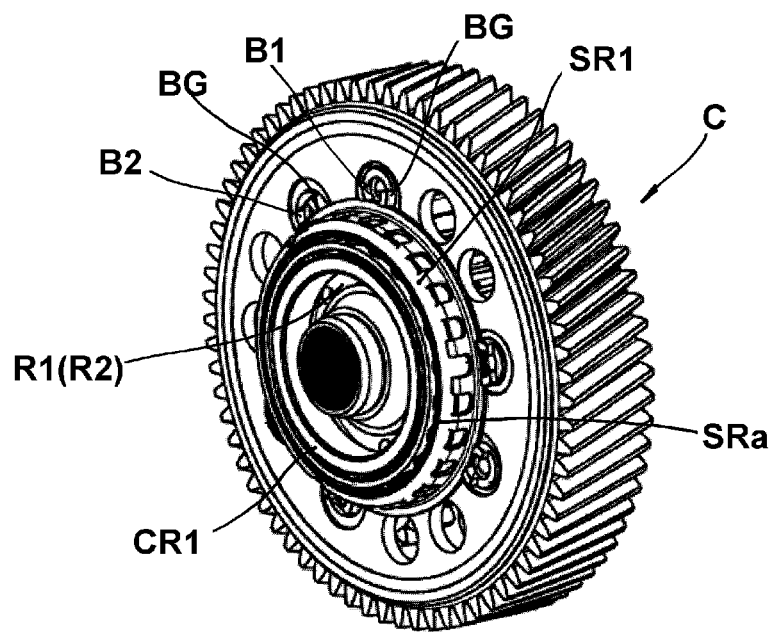
FIG. 3 is a perspective representation of the planetary gear train according to FIGS. 1 and 2.

The representation according to FIG. 3 shows, in the form of a perspective representation, the planetary gear train according to the disclosure according to FIGS. 1 and 2 in the form of a spur-gear differential. The gear train is assembled by introducing the planetary gears P1, P2 through the inner region of the annular collar CR1 into the inner region of the planet carrier C. The planetary gears P1, P2 are then moved radially outward into their fitted positions from the inside. In that position of the planetary gears P1, P2, the planetary gear pins B1, B2 are inserted into the planetary gears P1, P2 through the first planet carrier radial wall C1. The planetary gear pins B1 are so positioned that the first arc segment (BS1, see FIG. 2) of the end-face stop geometry faces the annular collar CR1. The planetary gear pins B2 provided for supporting the axially shorter second planetary gears P2 are so positioned that the second arc segment (BS2, see FIG. 2) of the end-face stop geometry faces the annular collar. The first annular disk SR1 is then pushed onto the annular collar CR1 until the annular disk SR1 is beneath the end-face stop geometries BG of the planetary gear pins B1, B2, if the first annular disk SR1 rests lightly on the planet carrier radial wall C1, the peripheral edge of the collar portion SRa that is at the front in this representation snaps into a peripheral groove of the annular collar CR1. This snapping-in is acoustically perceivable and can also be checked visually. The planetary gear pins B1, B2 are then secured by the first annular disk SR1 against falling out of the pin bore H1, H2 and in addition are also secured against rotation in the respective pin bore H1, H2. The second annular disk SR2 can then be fitted to the rear collar portion CR2. This fitting can also take place in an assembly step preceding the introduction of the planetary gears P1, P2 into the planet carrier C. The driven sun gears S1, S2 are then inserted into the planet carrier C. The cover rings R1, R2 are then pressed into the respective annular collar, and the spur-gear differential is thus completed as a sub-assembly group for a transmission.

Figure 4:
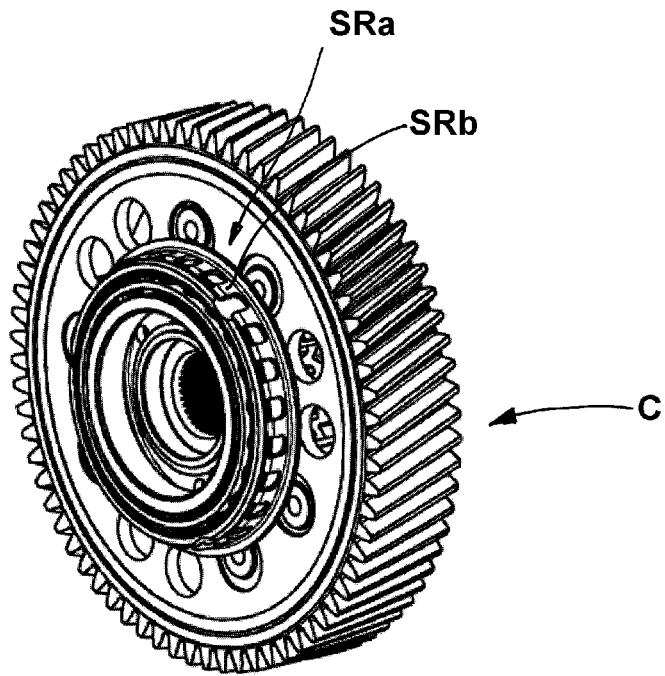
FIG. 4 is a perspective representation of a planetary gear train having an annular disk which is modified slightly as compared with the form of the annular disk according to FIG. 3, having successive individual claws in the peripheral direction.

The comments made above apply analogously to the representation according to FIG. 4. In a departure from the embodiment described above, a plurality of retaining claws SRb are here formed on the collar portion SRa of the first annular disk, each of which retaining claws engages with a front edge remote from the pins B1, B2 into a counter-geometry, in particular a peripheral groove of the planet carrier C.

The invention claimed is:

1. A planetary gear train, comprising:
a planet carrier which comprises at least a first radial wall with pin bores formed therein;
planetary gear pins seated at least at one end in the pin bores;
planetary gears arranged on the planetary gear pins;
an annular disk attached to the first radial wall, the annular disk being dimensioned to extend radially above an inner enveloping circle of the pin bores;
the first radial wall carries an annular collar, located radially inwardly of the inner enveloping circle, that extends axially out from the first radial wall; and
the annular disk includes an axially extending collar portion that is axially fixed to the annular collar.

2. The planetary gear train as claimed in claim 1, wherein the annular disk is in contact with the respective planetary gear pin such that the planetary gear pins are secured against falling out axially and have axial play sufficient to avoid over-determination in case of deformation.

3. The planetary gear train as claimed in claim 1, wherein the annular disk is in engagement with the respective planetary gear pin such that the planetary gear pins are secured against rotation about respective planetary gear pin axes thereof.

4. The planetary gear train as claimed in claim 3, the annular disk is in each case seated on an end-face portion of a respective one of the planetary gear pins.

5. The planetary gear train as claimed in claim 1, wherein there is formed in an end-face region of each of the planetary gear pins adjacent to the annular disk a contact geometry which engages with an outer contour of the annular disk.

6. The planetary gear train as claimed in claim 1, further comprising retaining claws formed in a region of the collar portion of the annular disk, and a counter geometry formed on the annular collar of the planet carrier into which the retaining claws engage.

7. The planetary gear train as claimed in claim 6, wherein the counter-geometry formed on the annular collar of the planet carrier provides an annular end face on which the retaining claws or a front edge of the collar portion are axially supported.

8. The planetary gear train as claimed in claim 6, further comprising a seat surface formed in an inner region of the annular collar of the planet carrier in which an annular cover is seated.

9. A planetary gear train, comprising:
a planet carrier which comprises at least a first radial wall with pin bores formed therein;
planetary gear pins seated at least at one end in the pin bores;
planetary gears arranged on the planetary gear pins;
an annular disk attached to the first radial wall, the annular disk being dimensioned to extend radially above an inner enveloping circle of the pin bores;
the first radial wall carries an annular collar;
the annular disk is axially fixed to the annular collar;
wherein a contact geometry is formed on an end-face of each of the planetary gear pins adjacent to the annular disk, and the contact geometry engages with an outer contour of the annular disk; and
the contact geometry forms a concavely curved arc segment, a radius of curvature of which corresponds to an outside radius of the annular disk.

10. The planetary gear train as claimed in claim 9, wherein the outside radius of the annular disk is smaller than or equal to a pitch circle radius of the planetary gear pin bores.

11. A planetary gear train, comprising:
a planet carrier having a first radial wall with pin bores formed therein and a second radial wall with pin bores formed therein;
planetary gear pins seated at a first end in the pin bores in the first radial wall and at a second end in the pin bores in the second radial wall;
planetary gears arranged on the planetary gear pins;
a first annular disk attached to the first radial wall, the first annular disk being dimensioned to extend radially above an inner enveloping circle of the pin bores;
a second annular disk attached to the second radial wall, the second annular disk being dimensioned to extend radially above the inner enveloping circle of the pin bores;

the first radial wall includes a first annular collar extending in a first axial direction, and the first annular disk is axially fixed to the first annular collar; and the second radial wall includes a second annular collar extending in a second axial direction, and the second annular disk is axially fixed to the second annular collar.

12. The planetary gear train as claimed in claim 11, wherein the first and second annular disks contact the ends of the respective planetary gear pins such that the planetary gear pins are axially secured.

13. The planetary gear train as claimed in claim 11, wherein at least one of the first or second annular disks is in engagement with the respective planetary gear pins such that the planetary gear pins are secured against rotation.

14. The planetary gear train as claimed in claim 11, wherein there is formed in at least one end-face region of each of the planetary gear pins adjacent to at least one of the first or second annular disks a contact geometry which engages with an outer contour of at least one of the first or second annular disks.

15. The planetary gear train as claimed in claim 14, wherein the contact geometry forms a concavely curved arc segment, a radius of curvature of which corresponds to an outside radius of the at least one of the first or second annular disk.

16. The planetary gear train as claimed in claim 11, wherein the outside radius of the first and second annular disks is smaller than or equal to a pitch circle radius of the planetary gear pin bores.

17. The planetary gear train as claimed in claim 11, wherein the first and second annular disks each comprise a respective collar portion and are respectively seated via the respective collar portions on the first annular collar and the second annular collar of the planet carrier.

18. The planetary gear train as claimed in claim 17, further comprising retaining claws formed in a region of the respective collar portions of the first and second annular disks, and respective counter geometries formed on the first and second annular collars of the planet carrier into which the retaining claws respectively engage.

19. The planetary gear train as claimed in claim 18, wherein the counter-geometries formed on the respective first and second annular collars of the planet carrier provide respective annular end faces on which the retaining claws or a front edge of the collar portions are axially supported.

* * * * *